March 22, 1955  A. CUZZI  2,704,380
INJECTION MOLDING MACHINE
Filed Dec. 28, 1950
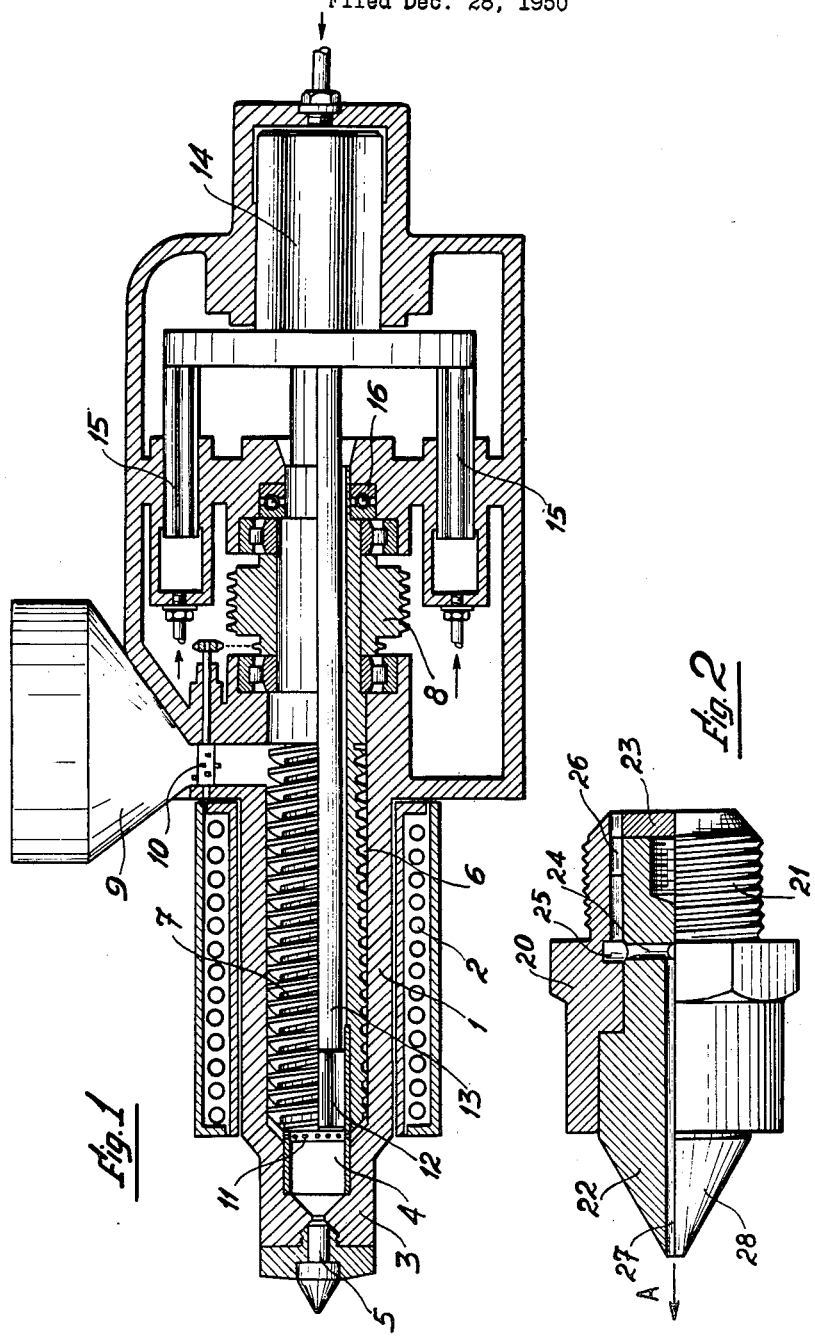
INVENTOR.
Alberto Cuzzi
BY Michael S. Striker
Agt.

United States Patent Office 2,704,380
Patented Mar. 22, 1955

2,704,380

INJECTION MOLDING MACHINE

Alberto Cuzzi, Milan, Italy

Application December 28, 1950, Serial No. 203,164

Claims priority, application Italy December 31, 1949

3 Claims. (Cl. 18—12)

The present invention relates to a machine for injection molding and more particularly to an improved injection unit.

The primary object of this invention is to provide an improved machine wherein the injection is performed by applying the injection pressure to a material supplied into the injection cylinder in plastified status yet, so that the plasticizing speed and the capacity of the injection cylinder are remarkably increased, without increasing the power required to operate the piston, or ram reciprocated in said cylinder and by means of which the injection pressure is applied to the plastified material.

Another object of this invention is to provide a simple and reliable device by means of which the plastic material is brought from the feed hopper to the injection cylinder, means being provided to ensure a regular flow of said material.

Another object of this invention is to provide an improved nozzle end of the injection cylinder, said nozzle being provided with a self-acting valve which prevents extrusion of plastified material as said nozzle does not firmly contact with the mold.

A further object of this invention is a general improvement of the construction of molding machines.

Heretofore, it has been the practice, in injection molding of thermo-setting material, to heat the material to at least the plastic temperaure in a cylinder in which a piston, or ram is reciprocated so that the plastified material is extruded at high pressure through a nozzle arranged at the fore end of said cylinder, the thermo-setting material being fed into said cylinder in form of a granular or powder cold material. Said conventional method for molding is subject to common objection that working speed of the machine is low because the cold material requires a pretty long time to reach the plastified status as required for injection.

Another objection to conventional injection molding was that long stroke of the piston is required for injection of small amount of material, because said piston, firstly acting against a material in powder or granular form, must transform said material in fluid coherent form before that the true injection step takes place.

Another objection to conventional injection molding was that high power is required to operate the piston, the action of which being transmitted to the plastified material through an intermediate mass of cold material, freshly drawn from the feed hopper.

An improved injection molding machine according to this invention is not subject to the above common objection considering that said machine substantially comprises an injection cylinder in which a piston is reciprocated to apply the necessary injection pressure into the material fed in said cylinder, a mechanical conveying device continuously feeding material from a feed hopper to said cylinder, an heating unit which heats said material during its movement from said feed hopper to said cylinder, a mechanical device which ensures continuous feeding of fresh material from the feed hopper to said conveying device, and a nozzle provided with a valve which closes when said nozzle is not pressed against the mold and when into the injection cylinder a pressure is attained by action of said conveying device.

Other objects, features and advantages of this invention will be apparent from the following description of a preferred form of embodiment of the invention, reference being had to the accompanying drawing wherein:

Fig. 1 is a longitudinal sectional view of an injection molding machine embodying this invention, part of the inner members being shown in elevation.

Fig. 2 represents the nozzle end of the injection cylinder, in an enlarged scale, said figure being a longitudinal sectional view and a view in elevation of said nozzle respectively in the upper half and in the lower half of the figure.

Referring first to Fig. 1:

An improved machine constructed as a preferred form of embodiment of this invention comprises a cylinder 1, the outer surface of which is coated with a tubular heating unit 2. The restricted fore part 3 of said cylinder 1 comprises the injection cylindrical chamber 4 provided with a nozzle end 5. The interior of cylinder 1 is of larger diameter than said cylindrical chamber 4 and contains a rotating cylinder 6 the outer surface of which is provided with an helical groove 7 deeply cut and of small pitch. Said rotating cylinder 6 is firmly connected to a driven gear 8 to which a rotative motion may be imparted by means of transmission multiple chain (not shown).

Right above the rear portion of the grooved surface 7 a feed hopper 9 is arranged, and in the lower restricted opening of said hopper 9 a rotating member 10 is mounted, said member being driven by a transmitting chain, diagrammatically shown, actuated by a driving gear forming part of gear 8.

Inside the fore portion of said cylinder 6 a piston 12 is slidably placed, said piston being the fore part of a bar, or rod 13 axially placed inside said cylinder 6.

The piston 12 constitutes the member which applies the injection pressure and it is operated in its forward motion by a main hydraulic piston 14, and in its backward motion by two smaller pistons 15, connected to said rod 13 by a cross-bar.

The elongated annular space comprised between the inner surface of cylinder 1 and the outer surface of rotating cylinder 6 communicates with the cylindrical chamber 4 through a round of little holes 11, placed in the rear portion of the said chamber, so that said holes are free when said piston 12 is at its retreated position only.

An important feature of an improved machine according to this invention consists in the variable deepness of helical groove 7 outer the rotating cylinder 6, said groove being deeper in its rear portion under said feed hopper 9 and of lesser deepness in its fore part. Said variable deepness brings about that the space confined between the flanks and the bottom of said groove and the inner surface of outer cylinder 1 progressively decreases in size from the rear part to the fore part of said space, said variable size being proportional to the decreasing of volume of the plastic material as it is transformed from its cold powder or granular form to its heated plastified form, thus a perfect filling up of said groove by said material is attained as said material is progressively conveyed from the hopper to the injection chamber and it being in the meantime progressively plastified.

The nozzle end of the machine according to this invention is shown in more detail in Fig. 2; referring to said figure:

The nozzle end is actuated in form of a removable assembly, comprising an outer tubular member 20 the rear portion of which is provided with an outer screw thread 21 fitting inside a correspondingly screw threaded hole provided inside the head of fore part 4 of the machine body.

Inside said outer member 20 an inner member 22 is slidably mounted, the fore portion of said inner member being external to said outer member and externally shaped in form of a cone 28 as requested to fit inside the conventional conical inlet opening of mold. The fore and middle portion of said inner member 22 is provided with an axial passage 27 the rear end of which communicates with radial passages 24 the outer ends of which open on the surface of said inner member 22. When said inner member 22 is placed on its retreated position inside outer member 20 (as shown in the drawing), the outer openings of said radial passages 24 are facing an annular groove 25 provided inside said outer member 20; said annular groove 25 at its turn communicates with longitudinal passages 26 cut inside the said outer member 20, said passages 26 having their rear ends opening on the rear surface of the assembly. A screwed cap 23 prevents member 22 to be slided outside outer member 20, and it confines the forward movement of said inner member 22 to a position in which radial passages 24 do not face the said annular groove 25.

An injection molding machine according to this present invention and substantially as shown and described, works as follows:

Before operation, the speed of revolution of rotating cylinder 6 is adjusted according to the volume of the plastic material to be injected into the mold on each injection cycle and according to the lapse of time strictly needed between each subsequent injection cycle, as required by opening and closing of the mold and by extraction of the product. The feeding of heating unit 2 is adjusted according to the amount of heat required for full plastification of the material conveyed into the helical groove 7 in the abovesaid amount and during the abovesaid lapse of time.

Said adjustments are obtained as result of proper test cycles.

As the machine is running, the cold material, in powder or in granular form, falls by gravity on the rear portion of helical groove 7, while the continuous falling is made sure by rotation of rotating member 10, which is shaped in form of a cylinder provided with a number of radial projections. Said rotating member 10 prevents that the cold material stops up in the bottleneck of the funnel-shaped hopper, said stopping up being a well known common objection of conventional machine, chiefly when cold material in granular form is fed.

The rotating helical groove 7 acts as feeding worm and it slowly brings the material to the injection chamber 4, while said material is in the meantime brought in plastified form by the heat received through the wall of outer cylinder 1. The first forward motion of piston 12 is performed as injection chamber 4 results quite full of plastified material under pressure, while the above described nozzle prevents any extrusion of plastified material through same. The reaction of the conveying thrust exerted by the conveying groove 7 is borne by an axial ball-bearing 16.

As the above conditions are attained, it will be easily understood as the forward motion of piston 12 may be imparted at any desirable speed, as more convenient for fast and proper filling of the mold, while the power required for said motion is reduced to a minimum, because said piston acts on plastified material only.

As any injection cycle is performed and the nozzle end is detached from the filled mold, the said nozzle closes under the pressure internal to chamber 4, so that the machine is brought back in its starting condition.

While I have illustrated and described my invention in a preferred form of embodiment only, I do not intend to be limited to the precise detail shown, since various modifications, improvements and structural changes may be made without departing from the spirit and the scope thereof.

Without further analysis, the foregoing will so fully reveal the gist of my invention that others can by applying current knowledge readily adapt it for various applications without omitting features that, from the standpoint of the prior art, fairly constitute the essential characteristic of the generic or specific aspects of this invention and, therefore, such adaptions should and are intended to be comprehended within the meaning and range of equivalence of the invention as set forth and as is to be defined in the appended claims.

What I claim as new and desire to have protected by Letters Patent is:

1. An injection molding machine comprising, in combination, a heated outer tubular member having an axially extending bore comprising a first cylindrical main portion, a second cylindrical portion having a diameter smaller than the diameter of said cylindrical main portion, and a tapered intermediate portion connecting said main portion with said other cylindrical portion; an inner tubular member rotatably mounted in said cylindrical main portion of said axially extending bore and having one end face thereof located facing and spaced from said intermediate portion of said bore so as to define with said intermediate portion an annular space, said inner tubular member having a cylindrical outer surface snugly fitting into said main portion of said axially extending bore and formed with a helical groove of uniform pitch having a depth decreasing from one end of said helical groove to the other end thereof; means feeding a plastic material into said helical groove at said one end thereof, said inner tubular member formed with an axially extending cylindrical inner face having the same diameter as said second cylindrical portion of said axially extending bore; a tube mounted in said second cylindrical portion of said axially extending bore and on said cylindrical inner face of said inner tubular member so as to separate said annular space from said second cylindrical portion of said axially extending bore, said tube being formed with a plurality of small apertures located in a circle in the region of said annular space; drive means rotating said inner tubular member so that material fed into said helical groove is moved to said annular space and pressed through said small apertures into said second portion of said axially extending bore; and a reciprocable piston slidably mounted in the interior of said tube movably between an advanced position located in said second portion of said axially extending bore and closing said apertures, and a retracted position uncovering said apertures and permitting material from said annular space to enter said second portion of said axially extending bore.

2. In an injection molding machine, in combination, a heated tubular member formed with an axially extending stepped cylindrical bore including a wider bore portion of wider diameter, a smaller bore portion of smaller diameter constituting an extrusion chamber, and an annular shoulder between said bore portions; a rotary conveyer screw member located in said wider bore portion and adapted to convey material toward said extrusion chamber, said conveyer screw member having a front end face located opposite said annular shoulder and spaced from the same; a tubular screen element projecting from said shoulder into said wider bore portion and to said front end face of said conveyer screw, so that an annular pressure chamber is formed in said wider bore portion by said screen element between said annular shoulder and said front end face, said screen element being formed with perforations establishing communication between said annular pressure chamber and said extrusion chamber; and means for extruding from said extrusion chamber a material compressed in said annular chamber, and forced through said perforations into said extrusion chamber by said conveyer screw member.

3. In an injection molding machine, in combination, a heated tubular member formed with an axially extending stepped cylindrical bore including a wider bore portion of wider diameter, a smaller bore portion of smaller diameter, and an annular shoulder between said bore portions; a rotary conveyer screw member located in said wider bore portion and adapted to convey material toward said extrusion chamber, said conveyer screw member having a front end face located opposite said annular shoulder and spaced from the same, said conveyer screw member being formed with an inner axially extending bore opening on said end face and having the same diameter as said smaller bore portion and constituting an extension of the same; a tubular screen element tightly fitting and secured to said smaller bore portion and having a portion projecting beyond said shoulder into said bore of said conveyer screw member so that an annular pressure chamber is formed in said wider bore portion by said screen element between said annular shoulder and said front end face, said screen element being formed with perforations establishing communication between said annular pressure chamber and the interior of said tubular screen element, the portion of said interior located forwardly of said perforations constituting an extrusion chamber; and an injector piston means located in the interior of said tubular screen element and being reciprocable between an advanced position extending into said extrusion chamber and closing said perforations, and a restricted position uncovering said perforations.

References Cited in the file of this patent

UNITED STATES PATENTS

| Number | Name | Date |
|---|---|---|
| 2,231,281 | Muller et al. | Feb. 11, 1941 |
| 2,359,839 | Goessling | Oct. 10, 1944 |
| 2,384,521 | Anderson et al. | Sept. 11, 1945 |
| 2,407,503 | Magerkurth et al. | Sept. 10, 1946 |
| 2,411,971 | MacMillin et al. | Dec. 3, 1946 |
| 2,461,282 | Jobst | Feb. 8, 1949 |
| 2,477,258 | MacMillin | July 26, 1949 |

FOREIGN PATENTS

| Number | Country | Date |
|---|---|---|
| 511,764 | Great Britain | Aug. 23, 1939 |